No. 627,342. Patented June 20, 1899.
M. LA FOUNTAIN, Jr.
CLOTH SHEARING MACHINE.
(Application filed Apr. 19, 1898.)
(No Model.)
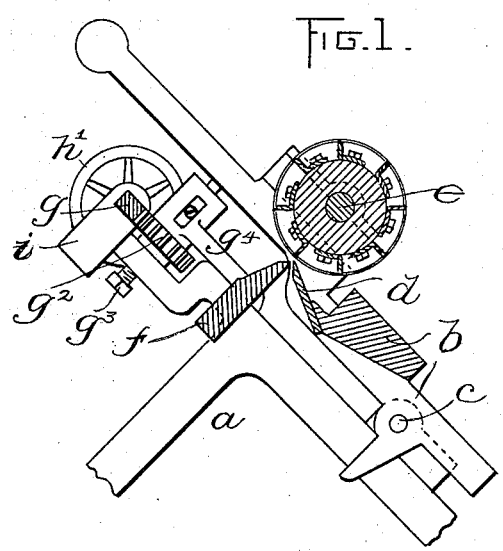
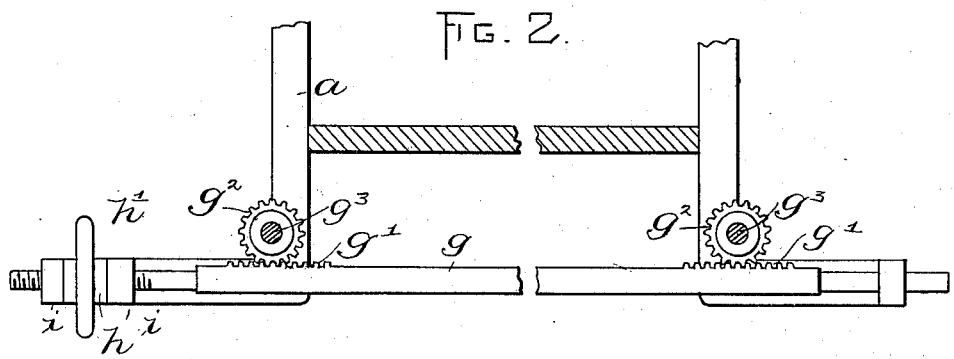
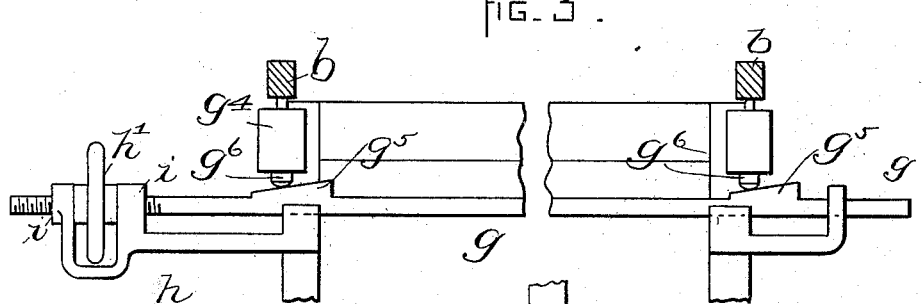
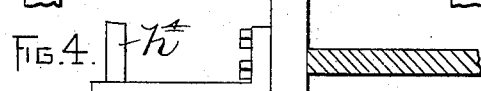
WITNESSES: INVENTOR:

UNITED STATES PATENT OFFICE.

MAXIM LA FOUNTAIN, JR., OF WOONSOCKET, RHODE ISLAND, ASSIGNOR TO THE WOONSOCKET NAPPING MACHINERY COMPANY, OF SAME PLACE.

CLOTH-SHEARING MACHINE.

SPECIFICATION forming part of Letters Patent No. 627,342, dated June 20, 1899.

Application filed April 19, 1898. Serial No. 678,112. (No model.)

*To all whom it may concern:*

Be it known that I, MAXIM LA FOUNTAIN, Jr., of Woonsocket, in the county of Providence and State of Rhode Island, have invented certain new and useful Improvements in Cloth-Shearing Machines, of which the following is a specification.

This invention has relation to machines for shearing cloth such as described in my Patent No. 573,669, dated December 22, 1896, and has for its object to provide certain improvements in the same whereby the rotating shear and ledger-blade may be adjusted with relation to the cloth-rest with great nicety to cut more or less of the nap, as may be required.

To this end the invention consists in a shearing-machine of a stationary blade, a rotating shear, a frame upon which the rotating shear and blade are journaled, and mechanism for adjusting said frame, comprising a bar arranged transversely of the machine and longitudinally movable and devices coöperating with said bar and adjusted thereby for moving the ends of said frame to the same extent.

Reference is to be had to the accompanying drawings, and to the letters marked thereon, forming a part of this specification, the same letters designating the same parts or features, as the case may be, wherever they occur.

Of the drawings, Figure 1 represents in section a portion of a cloth-shearing machine. Fig. 2 represents a front elevation of the same, partially in section. Fig. 3 represents a somewhat-modified construction embodying the invention. Fig. 4 represents still another form of the invention.

Referring to the drawings, $a$ indicates the stationary frame of the machine, to which a movable frame $b$ is pivoted at $c$. The frame $c$ is fulcrumed at each end, and it carries a stationary or ledger blade $d$ and a rotating shear $e$, which coacts with the ledger-blade in shearing the nap of the cloth, which is drawn over a stationary cloth-rest $f$, secured on the frame $a$. So far the apparatus described does not differ from the device illustrated in my Patent No. 573,669.

In order to adjust the ends of the frame $b$ to the same extent, and thereby move the shears toward or from the stationary rest $f$ for the purpose of cutting more or less of the nap of the cloth, I employ a longitudinally-movable bar $g$, supported in guides at each end in the stationary frame. This bar is moved longitudinally by a nut $h$, engaging the threaded end thereof, and held against axial movement by two guides $i$ $i$, supported by the stationary frame. The nut is provided with a hand-wheel $h'$, so that by turning it one way or the other the bar is moved correspondingly.

As shown in Fig. 2, the bar is formed with rack-teeth $g'$ $g'$, which intermesh with pinions $g^2$ $g^2$, constructed with internal screw-threads to receive threaded studs $g^3$ $g^3$, adapted to move longitudinally in bearings or guideways $g^4$, as shown in Fig. 1. The ends of the screw-studs rest against the ends of the movable frame $b$, and consequently when the bar $g$ is moved longitudinally the pinions or toothed nuts $g^2$, which are held against movement between the guideways $g^4$ and the frame of the machine, are rotated and the screw-studs $g^3$ $g^3$ are adjusted to the same extent to move the movable frame toward or from the rest $f$.

It is evident that I may employ means other than shown in Fig. 2 to be interposed between the longitudinally-movable bar $g$ and the ends of the movable frame. In Fig. 3 I have shown the bar $g$ as provided with two wedges or inclines $g^5$ $g^5$, on which the longitudinally-movable studs $g^6$ $g^6$ rest. By turning the nut $h$ and advancing the bar $g$ the studs $g^6$ are caused to slide upon the inclined edges of the bar $g$ to adjust the frame. In both of these embodiments of my invention a longitudinal movement of the bar $g$ transversely of the machine causes a longitudinal movement of the studs $g^3$ or $g^6$ in the direction of an angle of ninety degrees thereto.

It will of course be understood that the adjusting device at each end of the movable frame are duplicates and that the rack-teeth $g'$ $g'$ or the wedges $g^5$ $g^5$ are exactly similar, so that when the bar $g$ is moved the two ends of the movable frame are moved to the same extent to preserve a parallelism of the shaft of the rotary shear and edge of the stationary shear $d$.

Instead of forming the nut $h$ with a hand-wheel it is evident that I may provide it with bevel-teeth, as at $h^2$ in Fig. 4, and turn it by a bevel-wheel $h^3$ on a shaft $h^4$, rotated in any suitable way. In fact, the described mechanisms for moving the bar *g* may be varied as desired without departing from the spirit and scope of the invention, which comprehends, broadly, adjusting devices at each end of the shear-supporting frame and a longitudinally-movable bar arranged transversely of the machine for varying the positions of the said adjusting devices.

Having thus explained the nature of the invention and described a way of constructing and using the same, though without attempting to set forth all of the forms in which it may be made or all of the modes of its use, I declare that what I claim is—

1. In a cloth-shearing machine, the combination with a cloth-rest, a ledger-blade, a rotary shear, and a movable frame on which said blade and shear are supported, of a bar arranged transversely of the machine and longitudinally movable, means for moving said bar and holding it at any desired adjustment and means operated upon by said bar for adjusting the ends of the movable frame to the same extent.

2. In a cloth-shearing machine, the combination with a cloth-rest, an adjustable frame, and a ledger-blade and rotary shear supported upon said frame, of a movable stud for each end of the frame, and a cross-bar having means for engaging said studs, and means for moving said cross-bar longitudinally to adjust the said studs, said means comprising threads on the end of said bar, and a rotary nut held against displacement and engaging the threads on said bar.

3. In a cloth-shearing machine, the combination with a cloth-rest, an adjustable frame, and a ledger-blade and rotary shear supported upon said frame, of a movable stud for each end of the frame, a cross-bar movable transversely of the machine, said bar being provided with means for adjusting said studs at right angles thereto when it is moved and means consisting of a rotary nut tapped on said rod and held against displacement, for adjusting said rod and holding it after adjustment.

4. In a cloth-shearing machine, the combination with a cloth-rest, an adjustable frame, and a ledger-blade and rotary shear supported upon said frame, of a movable stud for each end of the frame, a cross-bar movable transversely of the machine for adjusting said studs simultaneously, said bar being provided with screw-threads, and a stationarily-mounted nut upon said threaded portion of the bar for adjusting it transversely to the machine.

5. In a cloth-shearing machine, the combination with a cloth-rest, an adjustable frame, and a ledger-blade, and rotary shear supported upon said frame, of a movable stud for each end of the frame, a cross-bar having inclined portions or wedges on which said studs rest whereby when said bar is moved, said studs are adjusted and means for adjusting said bar longitudinally and holding it after adjustment.

In testimony whereof I have affixed my signature in presence of two witnesses.

MAXIM LA FOUNTAIN, JR.

Witnesses:
HARRY S. GREEVE,
CHARLES H. McFEE.